US012730447B2

(12) United States Patent
Sadek et al.

(10) Patent No.: US 12,730,447 B2
(45) Date of Patent: Sep. 8, 2026

(54) SYSTEMS AND METHODS FOR MULTI-OBJECT NAVIGATION IN REAL ENVIRONMENTS

(71) Applicant: NAVER CORPORATION, Gyeonggi-do (KR)

(72) Inventors: Assem Sadek, Grenoble (FR); Guillaume Bono, Crolles (FR); Christian Wolf, Fontaines Saint Martin (FR); Boris Chidlovskii, Meylan (FR); Atilla Baskurt, Meyzieu (FR)

(73) Assignee: NAVER CORPORATION, Gyeonggi-Do (KR)

( * ) Notice: Subject to any disclaimer, the term of this patent is extended or adjusted under 35 U.S.C. 154(b) by 460 days.

(21) Appl. No.: 18/202,539

(22) Filed: May 26, 2023

(65) Prior Publication Data

US 2024/0393791 A1 Nov. 28, 2024

(51) Int. Cl.

| | |
|---|---|
| ***G05D 1/00*** | (2024.01) |
| ***G01C 21/00*** | (2006.01) |
| ***G01S 17/89*** | (2020.01) |

(52) U.S. Cl.
CPC ........... *G05D 1/0246* (2013.01); *G01C 21/38* (2020.08); *G01S 17/89* (2013.01); *G05D 1/0274* (2013.01)

(58) Field of Classification Search
None
See application file for complete search history.

(56) References Cited

U.S. PATENT DOCUMENTS

| | | | | |
|---|---|---|---|---|
| 11,348,332 | B2 * | 5/2022 | Northcutt | B25J 11/008 |
| 11,526,174 | B2 * | 12/2022 | Bhowmick | G06N 3/044 |
| 2023/0132280 | A1 * | 4/2023 | Narayanan | G01C 21/383 700/255 |
| 2024/0362924 | A1 * | 10/2024 | Nandiraju | G05D 1/2467 |
| 2025/0199542 | A1 * | 6/2025 | Leong | G06V 20/58 |

OTHER PUBLICATIONS

Mantelli, Mathias & Noori, Farzan Majeed & Pittol, Diego & Maffei, Renan & Torresen, Jim & Kolberg, Mariana. (2022). Semantic Temporal Object Search System Based on Heat Maps. Journal of Intelligent & Robotic Systems. 106. 10.1007/s10846-022-01760-8. (Year: 2022).*

(Continued)

*Primary Examiner* — Khoi H Tran
*Assistant Examiner* — Trang Dang

(57) ABSTRACT

A navigating robot includes: a feature module configured to detect objects in images captured by a camera of the navigating robot while the navigating robot is in a real world space; a mapping module configured to generate a map including locations of objects captured in the images and at least one attribute of the objects; and a navigation module trained to find and navigate to N different objects in the real world space in a predetermined order by: when a location of a next one of the N different objects in the predetermined order is stored in the map, navigate toward the next one of the N different objects in the real world space; and when the location of the next one of the N different objects in the predetermined order is not stored in the map, navigate to a portion of the map not yet captured in any images.

23 Claims, 7 Drawing Sheets

(56) References Cited

OTHER PUBLICATIONS

"Habitat sim2real." Github, 2023. https://github.com/wgw101/habitat_sim2real.
"LoCoBot: An Open Source Low Cost Robot." Carnegie Mellon University; Printed Dec. 2023. http://www.locobot.org.
Adamkiewicz, Michal, Timothy Chen, Adam Caccavale, Rachel Gardner, Preston Culbertson, Jeannette Bohg, and Mac Schwager. "Vision-Only Robot Navigation in a Neural Radiance World." *IEEE Robotics and Automation Letters* . 2022.
Anderson, Peter, Angel Chang, Devendra Singh Chaplot, Alexey Dosovitskiy, Saurabh Gupta, Vladlen Koltun, Jana Kosecka, et al. "On Evaluation of Embodied Navigation Agents." arXiv, Jul. 17, 2018.
Beeching, Edward, Christian Wolf, Jilles Dibangoye, and Olivier Simonin. "Deep Reinforcement Learning on a Budget: 3D Control and Reasoning Without a Supercomputer." arXiv, Apr. 3, 2019.
Beeching, Edward, Jilles Dibangoye, Olivier Simonin, and Christian Wolf. "Learning to Plan with Uncertain Topological Maps." arXiv, Jul. 10, 2020.
Chaplot, Devendra Singh, Dhiraj Gandhi, Abhinav Gupta, and Ruslan Salakhutdinov. "Object Goal Navigation Using Goal-Oriented Semantic Exploration," NeurIPS 2020.
Chaplot, Devendra Singh, Dhiraj Gandhi, Saurabh Gupta, Abhinav Gupta, and Ruslan Salakhutdinov. "Learning to Explore Using Active Neural Slam," ICLR, 2020.
Chaplot, Devendra Singh, Helen Jiang, Saurabh Gupta, and Abhinav Gupta. "Semantic Curiosity for Active Visual Learning." In *Computer Vision—ECCV*, 2020.
Chaplot, Devendra Singh, Murtaza Dalal, Saurabh Gupta, Jitendra Malik, and Ruslan Salakhutdinov. "SEAL: Self-Supervised Embodied Active Learning Using Exploration and 3D Consistency," NeurIPS 2021.
Chaplot, Devendra Singh, Ruslan Salakhutdinov, Abhinav Gupta, and Saurabh Gupta. "Neural Topological SLAM for Visual Navigation." In *Conference on Computer Vision and Pattem Recognition* (*CVPR*), 2020.
Chattopadhyay, Prithvijit, Judy Hoffman, Roozbeh Mottaghi, and Aniruddha Kembhavi. "RobustNav: Towards Benchmarking Robustness in Embodied Navigation." arXiv, Jun. 8, 2021.
Chen, Liang-Chieh, George Papandreou, Florian Schroff, and Hartwig Adam. "Rethinking Atrous Convolution for Semantic Image Segmentation." arXiv, Dec. 5, 2017.
Chen, Lili, Kevin Lu, Aravind Rajeswaran, Kimin Lee, Aditya Grover, Michael Laskin, Pieter Abbeel, Aravind Srinivas, and Igor Mordatch. "Decision Transformer: Reinforcement Learning via Sequence Modeling," NeurIPS 2021.
Chen, Shizhe, Pierre-Louis Guhur, Makarand Tapaswi, Cordelia Schmid, and Ivan Laptev. "Think Global, Act Local: Dual-Scale Graph Transformer for Vision-and-Language Navigation." In *Conference on Computer Vision and Pattem Recognition* (*CVPR*), 2022.
Chen, Tao, Saurabh Gupta, and Abhinav Gupta. "Learning Exploration Policies for Navigation," ICLR, 2019.
Edward Beeching, C. Wolf, J. Dibangoye, and O. Simonin. Deep Reinforcement Learning on a Budget: 3D Control and Reasoning Without a Supercomputer. In ICPR, 2019.
Edward Beeching, J. Dibangoye, O. Simonin, and C. Wolf. Learning to reason on uncertain topological maps. In European Conference on Computer Vision (ECCV), 2020.
Eysenbach, Benjamin, Shreyas Chaudhari, Swapnil Asawa, Sergey Levine, and Ruslan Salakhutinov. "Off-Dynamics Reinforcement Learning: Training for transfer with domain classifiers," ICLR, 2021.
Fang, Kuan, Alexander Toshev, Li Fei-Fei, and Silvio Savarese. "Scene Memory Transformer for Embodied Agents in Long-Horizon Tasks." In *Conference on Computer Vision and Pattem Recognition* (*CVPR*), 2019.
Ghosh, Dibya, Jad Rahme, Ryan P Adams, Aviral Kumar, Amy Zhang, and Sergey Levine. "Why Generalization in RL Is Dif?cult: Epistemic POMDPs and Implicit Partial Observability," NeurIPS, 2021.
Henriques, Joao F., and Andrea Vedaldi. "MapNet: An Allocentric Spatial Memory for Mapping Environments." In *Conference on Computer Vision and Pattem Recognition*, 2018.
Höfer, Sebastian, Kostas Bekris, Ankur Handa, Juan Camilo Gamboa, Florian Golemo, Melissa Mozifian, Chris Atkeson, et al. "Perspectives on Sim2Real Transfer for Robotics: A Summary of the R:SS 2020 Workshop." arXiv, Dec. 7, 2020.
Janner, Michael, Qiyang Li, and Sergey Levine. "Offline Reinforcement Learning as One Big Sequence Modeling Problem," NeurIPS, 2021.
Kadian, Abhishek, Joanne Truong, Aaron Gokaslan, Alexander Clegg, Erik Wijmans, Stefan Lee, Manolis Savva, Sonia Chernova, and Dhruv Batra. "Sim2Real Predictivity: Does Evaluation in Simulation Predict Real-World Performance?" arXiv Aug. 2020.
Labbé, Mathieu, and François Michaud. "RTAB-Map as an Open-source Lidar and Visual Simultaneous Localization and Mapping Library for Large-scale and Long-term Online Operation." *Joumal of Field Robotics*, 2019.
Li, Xueting, Shalini De Mello, Xiaolong Wang, Ming-Hsuan Yang, Jan Kautz, and Sifei Liu. "Learning Continuous Environment Fields via Implicit Functions," ICLR 2022.
Marza, Pierre, Laetitia Matignon, Olivier Simonin, and Christian Wolf. "Teaching Agents How to Map: Spatial Reasoning for Multi-Object Navigation," IROS 2022.
Parisotto, Emilio, and Ruslan Salakhutdinov. "Neural Map: Structured Memory for Deep Re-inforcement Learning," ICLR 2018.
Pashevich, Alexander, Cordelia Schmid, and Chen Sun. "Episodic Transformer for Vision-and-Language Navigation." In *Intemational Conference on Computer Vision* (*ICCV*), 2021.
Peng, Xue Bin, Marcin Andrychowicz, Wojciech Zaremba, and Pieter Abbeel. "Sim-to-Real Transfer of Robotic Control with Dynamics Randomization." arXiv, Mar. 2018.
Ramakrishnan, Santhosh Kumar, Devendra Singh Chaplot, Ziad Al-Halah, Jitendra Malik, and Kristen Grauman. "PONI: Potential Functions for ObjectGoal Navigation with Interaction-Free Learning." In *Conference on Computer Vision and Pattem Recognition* (*CVPR*), 2022.
Recastnavigation, Github, Dec. 2023. https://github.com/recastnavigation/recastnavigation.
Reed, Scott, Konrad Zolna, Emilio Parisotto, Sergio Gomez Colmenarejo, Alexander Novikov, Gabriel Barth-Maron, Mai Gimenez, et al. "A Generalist Agent." arXiv, Nov. 11, 2022.
Sadek, Assem, Guillaume Bono, Boris Chidlovskii, and Christian Wolf. "An In-Depth Experimental Study of Sensor Usage and Visual Reasoning of Robots Navigating in Real Environments." In *International Conference on Robotics and Automation* (*ICRA*), 2022.
Savinov, Nikolay, Alexey Dosovitskiy, and Vladlen Koltun. "Semi-Parametric Topological Memory for Navigation," ICLR, 2018.
Savva, Manolis, Abhishek Kadian, Oleksandr Maksymets, Yili Zhao, Erik Wijmans, Bhavana Jain, Julian Straub, et al. "Habitat: A Platform for Embodied AI Research." In *International Conference on Computer Vision* (*ICCV*), 2019.
Schmalstieg, Fabian, Daniel Honerkamp, Tim Welschehold, and Abhinav Valada. "Learning Long-Horizon Robot Exploration Strategies for Multi-Object Search in Continuous Action Spaces." arXiv, May 24, 2022.
Tan, Jie, Tingnan Zhang, Erwin Coumans, Atil Iscen, Yunfei Bai, Danijar Hafner, Steven Bohez, and Vincent Vanhoucke. "Sim-to-Real: Learning Agile Locomotion For Quadruped Robots." In *Robotics: Science and Systems*, 2018.
Thrun, Sebastian, Wolfram Burgard, and Dieter Fox. *Probabilistic Robotics*. MIT Press, 2005.
Truong, Joanne, Sonia Chernova, and Dhruv Batra. "Bi-Directional Domain Adaptation for Sim2Real Transfer of Embodied Navigation Agents." arXiv, Feb. 26, 2021.
Wani, Saim t al, "Multi-Object Navigation (MultiON) Challenge" hosted at Embodied AI Workshop, CVPR. 2021. http://multion-challenge.cs.sfu.ca/2021.html.

(56) References Cited

OTHER PUBLICATIONS

Wani, Saim, Shivansh Patel, Unnat Jain, Angel X Chang, and Manolis Savva. "MultiON: Benchmarking Semantic Map Memory Using Multi-Object Navigation," NeurIPS 2020.
Zhang, Fangyi, Jürgen Leitner, Zongyuan Ge, Michael Milford, and Peter Corke. "Adversarial Discriminative Sim-to-Real Transfer of Visuo-Motor Policies." arXiv, May 31, 2018.
Zhu, Xinge, Jiangmiao Pang, Cuyuna Yang, Jianping Shi, and Dahua Lin. "Adapting Object Detectors via Selective Cross-Domain Alignment." In *Conference on Computer Vision and Pattem Recognition* (*CVPR*), 2019.

* cited by examiner

SYSTEMS AND METHODS FOR MULTI-OBJECT NAVIGATION IN REAL ENVIRONMENTS

FIELD

The present disclosure relates to navigating robots and vehicles and more particularly to systems and methods for locating and navigating objects in spaces.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

SUMMARY

In a feature, a navigating robot includes: a feature module configured to detect objects in images captured by a camera of the navigating robot while the navigating robot is in a real world space; a mapping module configured to generate a map including locations of objects captured in the images and at least one attribute of the objects; and a navigation module trained to find and navigate to N different objects in the real world space in a predetermined order by: when a location of a next one of the N different objects in the predetermined order is stored in the map, actuate one or more propulsion devices of the navigating robot and navigate toward the next one of the N different objects in the real world space; and when the location of the next one of the N different objects in the predetermined order is not stored in the map, actuate one or more propulsion devices of the navigating robot and navigate to a portion of the real world space in the map not yet captured in any images from the camera.

In further features, the navigation module is trained based on finding and navigating to N simulated objects in a predetermined order in a simulated space.

In further features, the mapping module is configured to generate the map further based on input from a light detection and ranging (LIDAR) sensor of the navigating robot.

In further features, the navigation module is configured to, when the location of the next one of the N different objects in the predetermined order is stored in the map: determine a path to the location of the next one of the N different objects; and actuate the one or more propulsion devices of the navigating robot and navigate along the path toward the next one of the N different objects in the real world space.

In further features, the path is a shortest path.

In further features, at least a portion of the navigation module is trained using reinforcement learning.

In further features, the navigation module is configured to, when the next one of the N different objects in the predetermined order is captured in an image in route to the portion of the real world space, actuate the one or more propulsion devices of the navigating robot and navigate toward the next one of the N different objects in the real world space.

In further features, the N different objects are all different types of object.

In further features, the N different objects are different colors.

In further features, the N different objects are visually different than each other one of the N different objects.

In further features, the navigation module includes: an encoder module configured to receive the map and generate an encoding of the map; a long short term memory (LSTM) module configured to generate an output based on the encoding; a decoder module configured to decode the output of the LSTM module into a second map; a masking module configured to apply a mask to the second map; and a sampling module configured to sample the portion of the real world space in the map not yet captured in any images from the camera from the second map.

In further features, the mask is a fog-of-war mask.

In further features, the sampling module is configured to sample the portion from the second map based on maximizing a reward.

In a feature, a navigating robot includes: a means for detecting objects in images captured by a camera of the navigating robot while the navigating robot is in a real world space; a means for generating a map including locations of objects captured in the images and at least one attribute of the objects; and a means trained to find and navigate to N different objects in the real world space in a predetermined order by: when a location of a next one of the N different objects in the predetermined order is stored in the map, actuate one or more propulsion devices of the navigating robot and navigate toward the next one of the N different objects in the real world space; and when the location of the next one of the N different objects in the predetermined order is not stored in the map, actuate one or more propulsion devices of the navigating robot and navigate to a portion of the real world space in the map not yet captured in any images from the camera.

In a feature, a navigation method includes: detecting objects in images captured by a camera of a navigating robot while the navigating robot is in a real world space; generating a map including locations of objects captured in the images and at least one attribute of the objects; and based on training, navigating to N different objects in the real world space in a predetermined order by: when a location of a next one of the N different objects in the predetermined order is stored in the map, actuating one or more propulsion devices of the navigating robot and navigating toward the next one of the N different objects in the real world space; and when the location of the next one of the N different objects in the predetermined order is not stored in the map, actuating one or more propulsion devices of the navigating robot and navigating to a portion of the real world space in the map not yet captured in any images from the camera.

In further features, the training includes training based on finding and navigating to N simulated objects in a predetermined order in a simulated space.

In further features, generating the map includes generating the map further based on input from a light detection and ranging (LIDAR) sensor of the navigating robot.

In further features, when the location of the next one of the N different objects in the predetermined order is stored in the map, the navigation method includes: determining a path to the location of the next one of the N different objects; and actuating the one or more propulsion devices of the navigating robot and navigating along the path toward the next one of the N different objects in the real world space.

In further features, at least a portion of the training includes training using reinforcement learning.

In further features, when the next one of the N different objects in the predetermined order is captured in an image in route to the portion of the real world space, the navigation method includes actuating the one or more propulsion devices of the navigating robot and navigating toward the next one of the N different objects in the real world space.

In further features, at least one of: the N different objects are all different types of object; the N different objects are different colors; and the N different objects are visually different than each other one of the N different objects.

In further features, the navigation method further includes: receiving the map and generating an encoding of the map; by a long short term memory (LSTM) module, generating an output based on the encoding; decoding the output into a second map; applying a mask to the second map; and sampling the portion of the real world space in the map not yet captured in any images from the camera from the second map.

In further features, the sampling includes sampling the portion from the second map based on maximizing a reward.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Visual navigation of mobile robots combines the domains of vision and control. The vision aspect involves image retrieval. Navigation can be described as finding a suitable and non-obstructed path between a starting location and a destination location. A navigating robot includes a control module configured to move the navigating robot based on input from one or more sensors (e.g., cameras, light detection and ranging (LIDAR), etc.).

Navigation has been classically solved in robotics through the combination of simultaneous localization and mapping (SLAM) and planning. Beyond waypoint planning, problems involving significant components of (visual) high-level reasoning may be pursued in simulated environments, such as with large-scale machine learning (e.g., reinforcement learning (RL)), offline-RL, or imitation learning. This may involve an agent learning various skills like local planning, mapping objects, and querying learned spatial representations. These more complex may be evaluated in simulated environments, but have not been evaluated in real world environments.

Multi-Object Navigation (Multi-ON) involves, during each episode, a navigating robot navigating a space to find and navigate to N objects with different attributes (e.g., cylinders of different colors) in a predetermined order where N is an integer greater than one. The navigating robot creates a map of the space and objects within the space during exploration while trying to find a present object to be found. A control module of the navigating robot can be trained in simulated environments to hopefully be able to perform the same task later in real environments with similar objects with the different visual attributes (e.g., the cylinders of different colors).

The present application involves a hybrid approach which decomposes the problem into two different skills: (1) waypoint navigation is addressed with SLAM combined with a symbolic planner and (2) exploration, semantic mapping and goal retrieval are dealt with deep neural networks trained with a combination of supervised learning and RL. This approach provides advantages over other methods in both simulated environments and real world environments.

Figure 1:
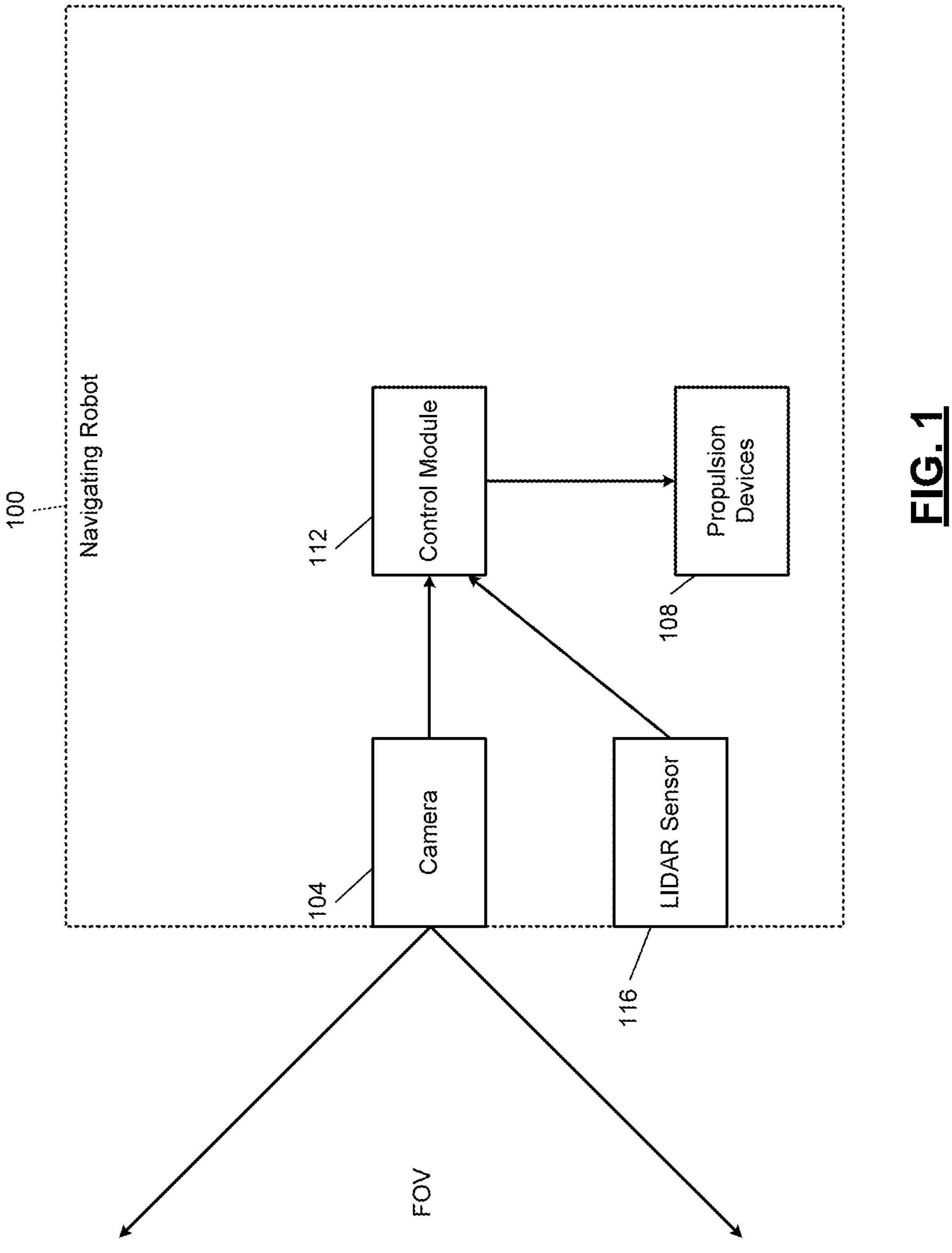
FIG. 1 is a functional block diagram of an example implementation of a navigating robot.

FIG. 1 is a functional block diagram of an example implementation of a navigating robot 100. The navigating robot 100 is a mobile vehicle. The navigating robot 100 includes a camera 104 that captures images within a predetermined field of view (FOV) in front of the navigating robot 100. The operating environment of the navigating robot 100 may be an indoor space or an outdoor space. In various implementations, the navigating robot 100 may include multiple cameras and/or one or more other types of sensing devices (e.g., LIDAR, radar, etc.).

The camera 104 may be, for example, a grayscale camera, a red, green, blue (RGB) camera, or another suitable type of camera. In various implementations, the camera 104 may also capture depth (D) information, such as in the example of a grayscale-D camera or a RGB-D camera. The camera 104 may be fixed to the navigating robot 100 such that the orientation and FOV of the camera 104 relative to the navigating robot 100 remains constant.

The navigating robot 100 includes one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly.

The camera 104 may update at a predetermined frequency, such as 60 hertz (Hz), 120 Hz, or another suitable frequency. The control module 112 may update a labeled map (discussed further below) each time the input from the camera 104 is updated.

A control module 112 is configured to control the propulsion devices 108 to locate and navigate to N different objects in a space (e.g., an indoor space) in a predetermined order where N is an integer greater than or equal to 2. In various implementations, N may be equal to 3. The objects may be, for example, cylinders or another different type of object. The objects may be the same type of objects or different objects. Each of the objects varies from the others in at least one way. For example, the objects may have the same shape (e.g., cylinders) but have different colors (e.g., red, blue, yellow, etc.) or may be different types of objects (e.g., cylinder, pyramid, cube, etc.).

The control module 112 creates a map of the space in which the N objects are located and locations of already discovered objects using images from the camera 104 and input from a light detection and ranging (LIDAR) sensor 116. When the next one of the N objects to be found and navigated to has not previously been captured in one or more images, the control module 112 controls the propulsion devices 108 to navigate to an unseen place to explore for the next one of the N objects. When the next one of the N objects to be found and navigated to has previously been captured, the control module 112 controls the propulsion devices to navigate to the location of the next one of the N objects.

In various implementations, each time step, the control module 112 may determine an action to be taken by the navigating robot 100. For example, the control module 112 may actuate the propulsion devices 108 to move the navigating robot 100 forward by a predetermined distance under some circumstances. The control module 112 may actuate the propulsion devices 108 to move the navigating robot 100 backward by a predetermined distance under some circumstances. The control module 112 may actuate the propulsion devices 108 to turn the navigating robot 100 to the right by the predetermined angle under some circumstances. The control module 112 may actuate the propulsion devices 108 to turn the navigating robot 100 to the left by the predetermined angle under some circumstances. The control module 112 may not actuate the propulsion devices 108 to not move the navigating robot 100 under some circumstances. The control module 112 may actuate the propulsion devices 108 to move the navigating robot 100 upward under some circumstances. The control module 112 may actuate the propulsion devices 108 to move the navigating robot 100 downward under some circumstances. The control module 112 may actuate the propulsion devices 108 to avoid the navigating robot 100 contacting any objects or walls of the space. In various implementations, the control module 112 may actuate the propulsion devices 108 to move in two or more directions at the same time.

Figure 2:
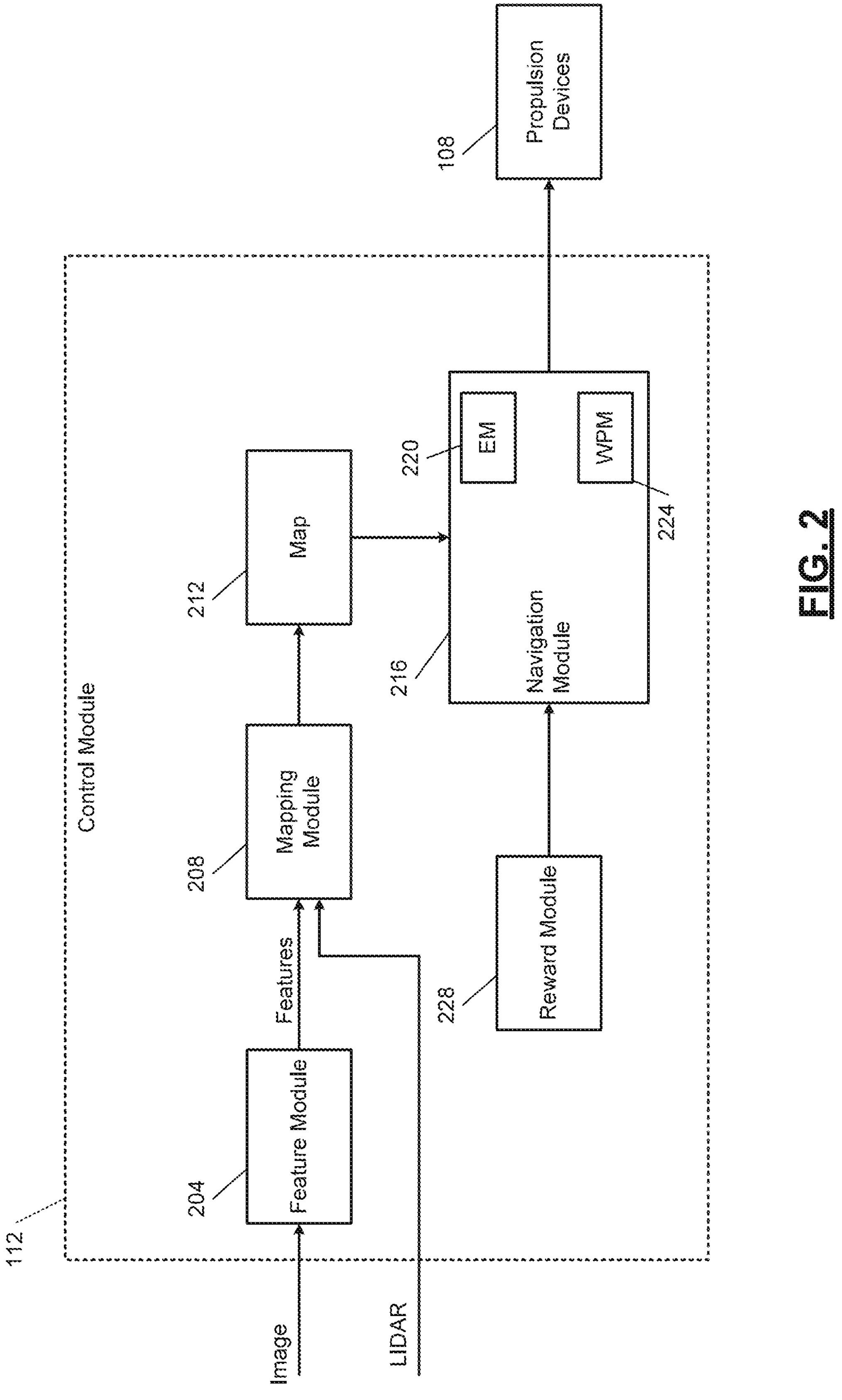
FIG. 2 is a functional block diagram of an example implementation of a control system including a control module of the navigating robot.
Figure 3:
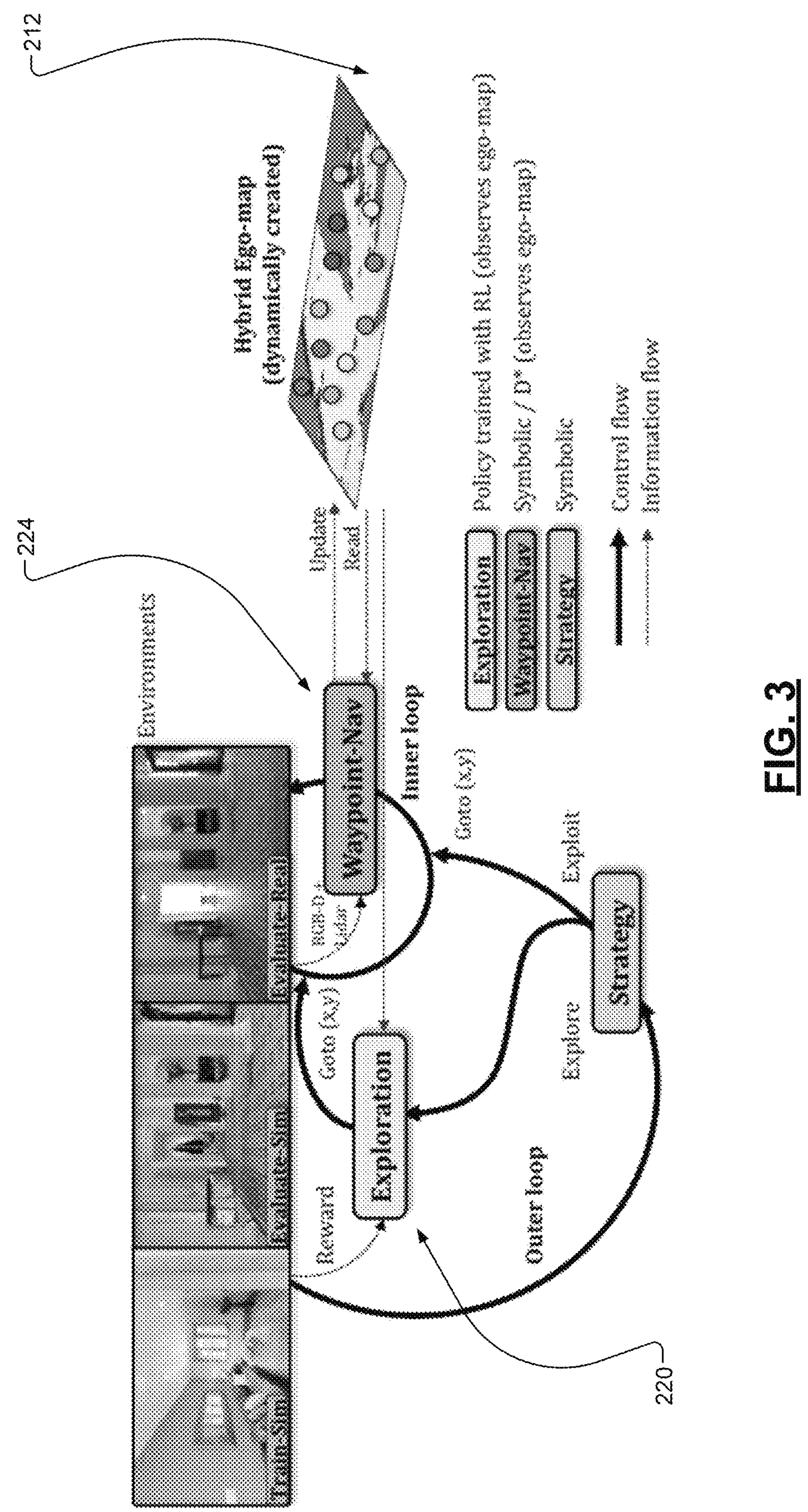
FIG. 3 is a functional block diagram of the control system of FIG. 2.

FIG. 2 is a functional block diagram of an example implementation of a control system including the control module 112. FIG. 3 is a functional block diagram of the control system of FIG. 2.

A feature module 204 receives images and extracts features from the images. The images may be from the camera 104 during real world use (including during evaluation) or from a simulated environment during training. A mapping module 208 generates a map 212 of the space in which the objects are located and locations of objects within the space using the features and LIDAR input. The LIDAR input may be from the LIDAR sensor 116 during real world use (including during evaluation) or simulated during training.

A navigation module 216 controls the propulsion devices 108 to locate and navigate to N different objects in the space in a predetermined order where N is an integer greater than or equal to 2. In various implementations, N may be equal to 3 or greater than 3. The objects may be, for example, cylinders or another different type of object. The objects may be the same type of objects or different objects. Each of the objects varies from the others in at least one way. For example, the objects may have the same shape (e.g., cylinders) but have different colors (e.g., red, blue, yellow, etc.) or may be different types of objects (e.g., cylinder, pyramid, cube, etc.). While the example of different colored cylinders is provided, the present application is generally applicable to objects that are visually different from each other with no two duplicate objects. The predetermined order may be, for example, first navigate to the red cylinder, second the blue cylinder, third the yellow cylinder, etc.

The navigation module 216 includes an exploration module (EM) 220 and a waypoint module (WPM) 224. When the next one of the N objects in the predetermined order to be navigated has not yet been identified and is therefore not yet present in the map 212, the exploration module 220 controls the propulsion devices 108 to explore the space to maximize coverage of the space and to maximize rewards from a reward module 228. This will increase a likelihood of finding the next one of the N objects in the predetermined order.

The reward module 228 may increase a reward for movement of the navigating robot and positioning of the FOV of the camera to a previously uncaptured portion of the space. The reward module 228 may decrease the reward for movement of the navigating robot and positioning of the FOV of the camera to a space that has been previously captured and/or the FOV of the camera overlapping a previously captured portion of the space.

Figure 4:
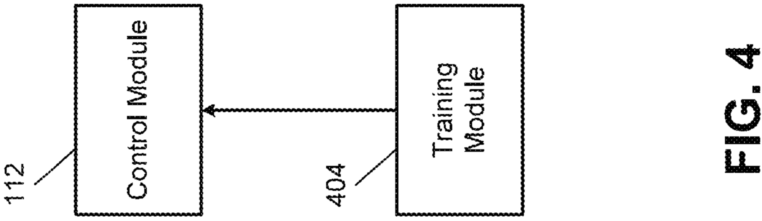
FIG. 4 is a functional block diagram of an example implementation of a training system.

FIG. 4 is a functional block diagram of an example implementation of a training system. A training module 404 trains the control module 112 (e.g., the exploration module 220) using for example reinforcement learning (RL) and simulated environments.

When the next one of the N objects in the predetermined order to be navigated has been identified and is therefore present in the map 212, the waypoint module 224 retrieves the location (e.g., coordinates) of the next one of the N objects from the map 212 and controls the propulsion devices 108 to navigate to the location of the next one of the N objects using a planner.

The map 212 is stored in memory and may include an occupancy grid of fixed spatial resolution centered on a current position and aligned with a heading direction of the navigating robot. The map 212 may be generated using a graph-based SLAM algorithm with loop closure based on images from the camera, the LIDAR input, and odometry sensor data from one or more odometers of the navigating robot. LIDAR input and/or the depth channel from the images may be used to create a two dimensional (2D) or three dimensional (3D) occupancy grid of the space associated with a node for an initial position of the navigating robot within the space.

The present application involves the Multi-Object Navigation task involving the navigating robot sequentially navigating to a set of objects in the predetermined order. This task definition may favor agents capable of learning to map seen objects in an internal spatial representation (the map 212), as navigating to them later in the episode may increase reward.

The present application involves evaluation of the control module 112 trained for the Multi-Object Navigation task in a real physical environment. The present application involves a hybrid approach where the task is decomposed into 2 parts: navigation aspects not related to semantics, (such as detection of navigable space and localization using geometric SLAM) combined with waypoint navigation on the map; and mapping semantic concepts for visual reasoning and exploiting them (exploration of the most promising areas of the environment exploiting layout regularities).

During navigation, the mapping module 208 using a SLAM algorithm creates and maintains a 2D metric representation in the form of a tensor/map (the map 212) and localizes the robot on it using LIDAR input. High-level features, extracted from visual RGB-D observations by the feature module 204 (e.g., a deep neural network or another suitable type of neural network), form a spatial and semantic point cloud (the map 212), whose spatial coordinates are aligned with the metric representation, such as illustrated in FIG. 3. An example SLAM algorithm is described in Labbe', et al., Rtab-map as an Open-Source LIDAR and Visual Simultaneous Localization and Mapping Library for Large-Scale and Long-term Online Operation, Journal of Field Robotics, vol. 36 no. 2, pp: 416-446, 2019, which is incorporated herein in its entirety.

The combined hybrid representation satisfies the needs of sub-skills of the agent: (i) to determine whether a target object has been observed in the past, (ii) to plan optimal trajectories between the agent and explored areas, and (iii) to determine the frontiers of unexplored areas in the environment and thus the next intermediate sub-goals in case the environment needs to explore to find the next goal. All these sub-skills are trained for separately by the training module 404, which limits sample complexity of training. The agent may refer to the navigating robot in the real world or in simulation.

The present application provides a hybrid approach for Multi-Object Navigation combining SLAM and path planning with learned components trained with supervised learning and R. Evaluation and fine tune training of the control module 112 is performed by the training module 404 based on operation in a real environment with manufactured reproductions of the N objects based upon which the control module 112 was trained in the simulated environment.

In various implementations, N may be equal to 3 (the 3 object variant of the Multi-ON task). This may be described as follows, during each episode, the goal of the navigating robot 100 is to find 3 cylindrical objects $G_N$, N=1, 2, 3, in a predetermined order, where $G_N$ is the Nth object to find. A found action is called by the navigation module 216 when the Nth object is found. The episode duration may be limited to a predetermined number of steps (movements to planned positions), such as 2,500 environment steps.

At each step t, the control module 112 receives an RGB-D observation $O_t \in R^{h \times w}$, a LIDAR frame (input), and a class label of the current target object taken from a predetermined number (e.g., 8) classes. Training of the control module 112 may be performed by the training module 404 using a simulated environment, such as the Habitat simulator. Performance is evaluated, however, in simulation and a real world environment. Fine tune training of the control module 112 may be performed by the training module 404 on the control module 112 based on the performance in the real world. The navigating robot 100 may be, for example, a robot by Locobot or another suitable type of navigating robot.

With operations of robots in real environment and conditions in mind, we follow the modular approach of FIGS. 2 and 3 may be used. The approach is hybrid: it leverages both trained neural network modules for perception and exploration, and other algorithms for occupancy mapping, localization and waypoint navigation. This approach reduces a gap between the simulation environment and the real world, avoiding pitfalls of end-to-end training of navigation in simulation followed by a transfer of neural models to the real environment.

Machine learning may be used by the training module 404 to train the control module 112. The training may be limited to use of training datasets with low gaps between simulation and real world. For this reason, during navigation the mapping module 208 builds a metric bird's eye view occupancy map (map 212) from the Lidar input and localizes itself on it using a SLAM algorithm, such as metric SLAM. Metric slam is described in Sebastian Thrun, et al., Probabilistic Robotics, MIT Press, 2005, which is incorporated herein in its entirety. This binary map is combined with an overlaid semantic point cloud by the mapping module 208, which contains the positions of goal objects and their semantic classes, which are detected from an RGB image using an object detection module of the feature module 204. The mapping module 208 may align detection and mapping using the SLAM algorithm's localization module.

Navigation is performed hierarchically on two different levels. On one level (outer loop of FIG. 3), 2D waypoint coordinates $p_t$=(x, y) are produced by the waypoint module 224 and provided to a lower level controller of the navigation module 216 (inner loop), whose task is to navigate to the waypoint using the maintained occupancy map 212. The navigation module 216 switches between two different strategies. A first strategy is exploration by the exploration module 220 when the next one of the N objects has not yet been observed in the space. The exploration module 220 may perform exploration with a learned policy trained by the training module 404 with RL. A second strategy may be referred to as exploitation and used when the next one of the N objects has been observed and thus is part of the semantic point cloud (map 212). In this case, the waypoint module 224 provides the location of the N-th location from the map 212 as new waypoint to the planner module of the navigation module 216. The navigation module 216 actuates the propulsion devices 108 to move to the waypoint according to the path planned by the planner module.

Regarding the map 212, to gather navigability information along its path and more efficiently revisit previously seen areas, the mapping module 208 builds the map 212 (which may be referred to as an EgoMap) and may be an occupancy grid of fixed spatial resolution centered on its current position and aligned with its heading direction.

In the real world, the mapping module 208 may generate the map 212 using, for example, the RTABMap library. This library uses a graph-based SLAM algorithm with loop closure, using as inputs RGB-D, Lidar, and odometry sensor data. Lidar and/or depth are used to create a 2D/3D local occupancy grid, associated to a node whose initial position relies on odometry integration. Descriptors are then created from keypoints extracted from RGB frames by the feature module 204 to facilitate node comparison and loop closure detection. The RTABMap library also includes short- and long-term memory management, global map compression, and multi-session mapping.

In simulation, privileged information may be used for the training including a complete top-down view of the space to be navigated. A mask, such as a fog-of-war mask may be applied by the training module 404 to the top-down view by ray-tracing in the agent's field of view directly on the top-down view using localization.

Both the real world and simulation approaches generate a global map on which the mapping module 208 may apply an affine transformation parameterized by the navigating robot's present pose to the map 212, which may be referred to as an ego-centric map (EgoMap).

The exploration module 220 may be trained by the training module 404 using machine learning. The exploration module 220 may not take the first person RGB input, but the map 212 $M_t$ produced by the metric SLAM algorithm. This leads to a significant simplification of the task and increased sample efficiency, and it minimizes the gap between simulation and the real world, as changes in lightning, color, and texture are avoided. The exploration module 220 may be a part of the outer loop and generates 2D waypoint coordinates $p_t$.

The task may be considered partially observable as: (i) not all areas of the scene have been observed at any point in time; (ii) for efficiency reasons, the EgoMap $M_t$ does not cover the full space, observed areas may therefore be forgotten when the navigating robot navigates sufficiently far away from them; (iii) even theoretically fully observable problems (MDPs) can be transformed into POMDPs ("Epistemic POMDPs") in the presence of uncertainty in the environment. The exploration module 220 may therefore include hidden memory $h_t$ and be recurrent.

The policy of the exploration module 220 $\pi$ predicts multi-modal distributions, as there are multiple valid trajectories exploring an environment efficiently. This may be implemented in the policy through an inductive bias, which forces prediction to pass through a spatial heatmap $H_t$, from which the chosen waypoint location is sampled. Before sampling, the exploration module 220 may restrict the heatmap to unexplored areas through masking. This choice also leads to a more interpretable model, as the distribution of targeted exploration points can be visualized.

Figure 5:
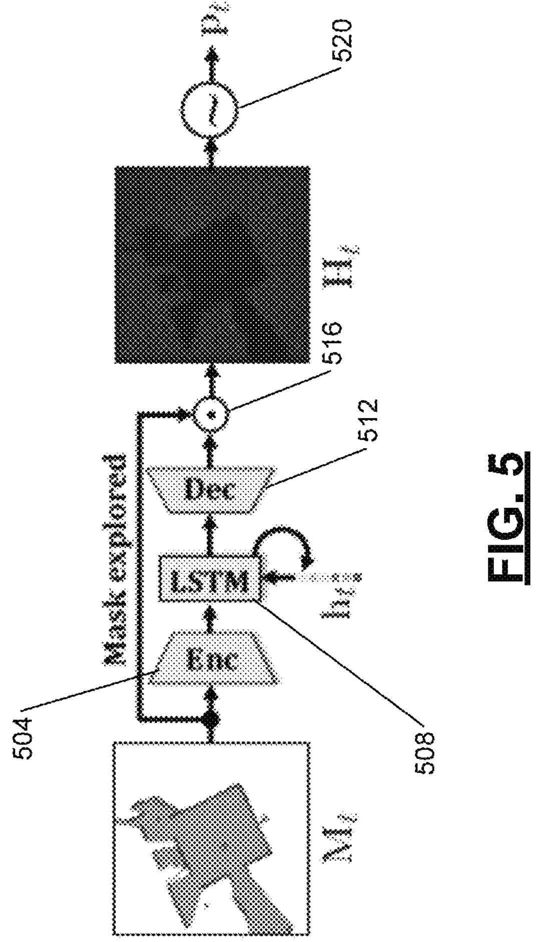
FIG. 5 is a functional block diagram of an example implementation of an exploration module.

FIG. 5 is a functional block diagram of an example implementation of the exploration module 220. The exploration module 220 may include an encoder module (Enc) 504, a long short-term memory (LSTM) module 508, a decoder module (Dec) 512, a masking module 516, and a sampling module 520. The encoder module 504 receives the EgoMap $M_t$ (212) and encodes the received EgoMap. The LSTM module 508 generates an output based on the encoding output by the encoder module 504. The decoder module 512 decodes the output of the LSTM 508 into a heatmap. The masking module 516 applies a mask to the heatmap, such as a fog-of-war mask or another suitable type of mask, to generate a masked heatmap $H_t$. The sampling module 520 samples a waypoint $p_t$ from the masked heatmap $H_t$, such as based on maximizing a reward. This can be formalized as follows.

$$h_t = \phi(M_t, h_{t-1}; \theta_\phi), \tag{1}$$

$$H_t' = \pi(h_t; \theta_\pi) \tag{2}$$

$$H_t = H_t' \odot [M_t == \text{Unexplored}]$$

$$p_t = \sim(H_t) \tag{3}$$

where $\theta_\pi$ and $\theta_\phi$ are trained parameters and $\phi$ is the update recurrent function of the LSTM module 508 with hidden state $h_t$. The gates are not shown in this notation for simplicity. $p_t=(x_t, y_t)$ is 2D coordinates of the point sampled from the heatmap $H_t$ and ~ is the sampling operator.

The training module 404 may train the exploration module 220 using RL to maximize coverage. The following reward function $r_t$ may be used during the training and/or to determine the reward by the reward module 228.

$$r_t = ar_{de}, \tag{4}$$

$$r_{de} = e_t - e_{t-1}$$

where $e_t$ is the explored area at step t, I is the number of inner environment steps to navigate to coordinates (x,y) sampled by the sampling module 520, a is a scaling hyperparameter and is a predetermined value, such as 0.01.

To navigate from a present position to the coordinates (x,y) sampled, waypoint $p_t$, the planner module of the navigation module 216 may determine a shortest path on the current occupancy EgoMap $M_t$. This may not be an optimal path as the map may not be equal to the unobserved map and the intermediate regions to be traversed might be unexplored. A dynamic planner module D* may be used to calculate the shortest path under assumptions and may replan when new information is available.

Potential failures and sub-optimal trajectories produced by local planning in uncertain conditions using D*, as described above, may negatively impact the training process of the exploration module 220. The exploration module 220 may be considered a part of the outer loop and generate waypoints $p_t$, receiving a reward only upon completion of the full local navigation process to the waypoint. Noise in local planning may impact stability of the RL training process and may lead to lack of convergence.

To solve this, the training module 404 may train the exploration module 220 by interfacing a local policy by imposing a predetermined length limit. The full trajectory from the current position to the next waypoint $p_t$ predicted by the exploration module 220 is split into a sequence of small sub goals distanced by a predetermined distance, such as 0.3 meters or another suitable distance, and the local policy may be limited to a predetermined number, such as 5, of these sub goals. The navigation module 216 may give control to the outer loop if the waypoint $p_t$ has been reached, or the limit of the predetermined number (e.g., 5) of the subgoals is reached. This choice lead to stable training and the trained exploration module 220 transfers well to the targeted exploration task, without changes. The same limitation on the length of local planning is also applied at deployment, which led to improved robustness in the real world and makes complex recovery behavior obsolete.

The object detection and mapping performed by the feature module 204 and the mapping module 208 may be considered a semantic segmentation task from the current RGB-D frame $o_t$, which we supervise from ground truth masks calculated from privileged information in the simulation space. The predictor may be, for example, a DeepLab v3 network or another suitable type of network. The DeepLab v3 network is described in L.-C Chen, et al., Rethinking Atrous Convolution for Semantic Image Segmentation, in CVPR, 2017, which is incorporated herein in its entirety.

Detected objects in the mask may be inversely projected and aligned with the EgoMap using depth information and the episodic odometry. Both depth and odometry may be noisy in the real environment and evaluation settings. Learning by the navigation module 216 may not be needed in the real environment after the training.

Given the architecture described herein, the navigation module 216 makes one decision—whether to perform exploration of the space or exploitation (navigation toward/to the next one of the N objects). The navigation module 216 makes this determination based on whether the next one of the N objects has been observed and mapped (exploitation) or not (exploration). If multiple objects of the same class have been detected, the location with a highest probability of detection of the next object (e.g., in terms of segmented object pixels) is chosen and navigated to by the navigation module 216. A minimum number of pixels may be required for an object to be mapped by the mapping module 208.

Figure 6:
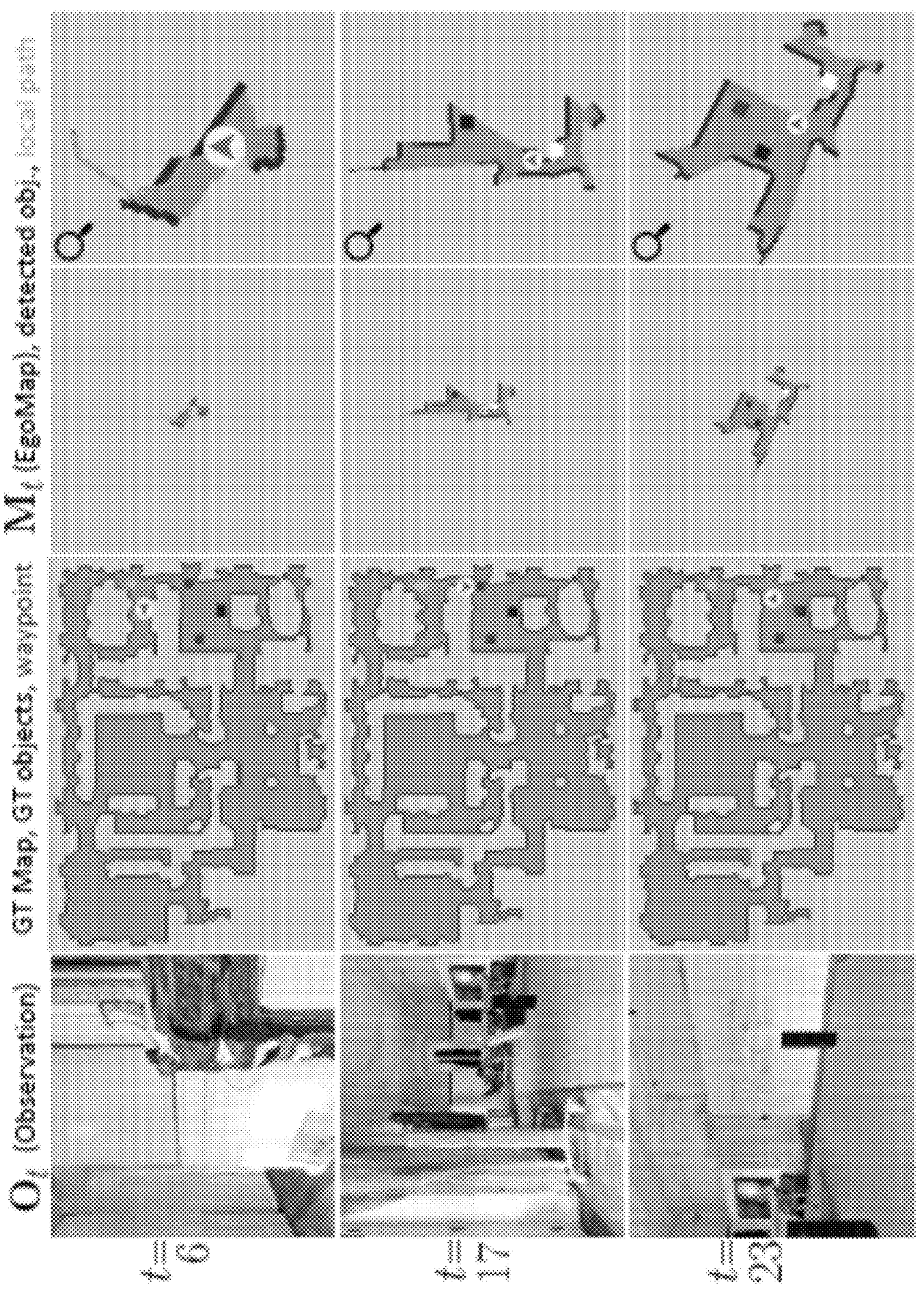
FIG. 6 is a visualization of an episode for an environment step.

FIG. 6 is a visualization of an episode for an environment step. The first column includes RGB images (observations) at different time (t) steps. The second column includes ground truth (GT) maps with GT goal positions and the present position of the navigating robot illustrated using an arrow within a circle at the different time steps. The third column includes EgoMaps $M_t$ with the planned local path to the next one of the N objects at the different time steps. The fourth column includes zoomed in illustrations of portions of the images of the third column. Navigation to the blue goal/object is the first goal in this example. At time step t=6, exploration is predicted. The navigating robot enters a new room. At time step t=17, the blue goal/object is detected. The navigation module 216 then switches to exploitation and advances toward/to the blue object/goal. At time step t=23, the navigating robot observes a green goal/object in the future and adds the location of the green goal/object to the map 212 for use in the future (when needed in the predetermined order). In this example, a false positive, a white goal/object is also detected and mapped. In this example, the white goal/object is not to be navigated to in the predetermined order.

Figure 7:
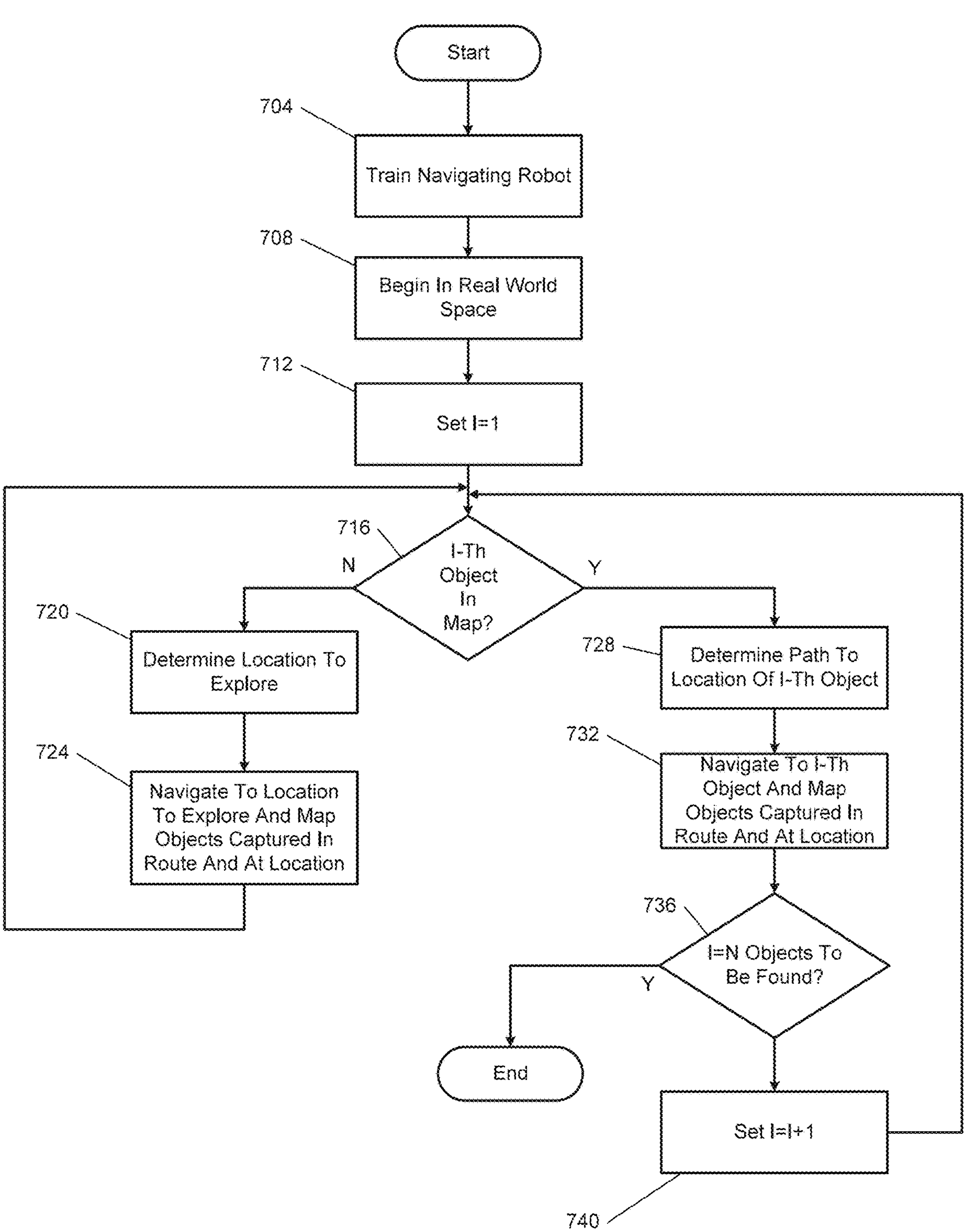
FIG. 7 is a flowchart depicting an example method of training a navigating robot and, by the navigating robot, navigating a space to find N objects in a predetermined order.

FIG. 7 is a flowchart depicting an example method of training a navigating robot and, by the navigating robot, navigating a space to find N objects in a predetermined order. The method begins at 704 with the training module 404 training the control module 112 of the navigating robot as described above. The training module 404 trains the navigating robot to find objects in a simulation environment.

At 708, operation of the navigating robot begins in the real world space. The camera 104 captures an image each predetermined period. The mapping module 208 updates the map 212 each predetermined period based on the image, the LIDAR input, and odometry data.

At 712, the navigation module 216 may set a counter value (I) equal to 1 to begin looking for and navigation to the first one of the N objects to be found in the predetermined order. At 716, the navigation module 216 determines whether the I-th one of the objects is present in the map 212. If 716 is false, control continues with 720. If 716 is true, control continues with 728.

At 720 (when the I-th one of the N objects is not in the map 212), the navigation module (more specifically the exploration module 220) determines a location to explore as described above. At 724, the navigation module 216 actuates the propulsion devices 108 to navigate to the location to explore. Objects are captured and the map is updated by the mapping module 208 while in route to the location. If the object is identified on the way to the location, control transitions to 728. Control may otherwise return to 716 after 724.

At 728 (when the I-th one of the N objects is in the map 212), the navigation module 216 (e.g., the waypoint module 224) determines a path (e.g., a shortest path) to the location of the I-th object stored in the map 212. At 732, the navigation module 216 actuates the propulsion devices 108 to navigate to the location of the I-th object. Objects are captured and the map is updated by the mapping module 208 while in route to the location. At 736, once reaching or within a predetermined distance of the I-th object, the navigation module 216 determines whether the counter value (I) is equal to the total number of objects (N) to be found and navigated to. If 736 is true, control may end. If 736 is false, at 740, the navigation module 216 may increment the counter value (e.g., set I=I+1), and control may return to 716.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A navigating robot, comprising:

a feature module configured to detect objects in images captured by a camera of the navigating robot while the navigating robot is in a real world space;

a mapping module configured to generate a map including locations of objects captured in the images and at least one attribute of the objects; and a navigation module trained to find and navigate to N different objects in the real world space in a predetermined order by:

when a location of a next one of the N different objects in the predetermined order is stored in the map, actuate one or more propulsion devices of the navigating robot and navigate toward the next one of the N different objects in the real world space; and when the location of the next one of the N different objects in the predetermined order is not stored in the map, actuate the one or more propulsion devices of the navigating robot and navigate to a portion of the real world space in the map not yet captured in any images from the camera, wherein the navigation module includes:

a masking module configured to apply a mask to a heatmap that is generated based on the map; and a sampling module configured to, from the masked heatmap, sample the portion of the real world space in the map not yet captured in any images from the camera.

2. The navigating robot of claim 1, wherein the navigation module is trained based on finding and navigating to N simulated objects in a second predetermined order in a simulated space.

3. The navigating robot of claim 1, wherein the mapping module is configured to generate the map further based on input from a light detection and ranging (LIDAR) sensor of the navigating robot.

4. The navigating robot of claim 1, wherein the navigation module is configured to, when the location of the next one of the N different objects in the predetermined order is stored in the map:

determine a path to the location of the next one of the N different objects; and actuate the one or more propulsion devices of the navigating robot and navigate along the path toward the next one of the N different objects in the real world space.

5. The navigating robot of claim 4, wherein the path is a shortest path.

6. The navigating robot of claim 1, wherein at least a portion of the navigation module is trained using reinforcement learning.

7. The navigating robot of claim 1, wherein the navigation module is configured to, when the next one of the N different objects in the predetermined order is captured in an image in route to the portion of the real world space, actuate the one or more propulsion devices of the navigating robot and navigate toward the next one of the N different objects in the real world space.

8. The navigating robot of claim 1, wherein the N different objects are all different types of object.

9. The navigating robot of claim 1, wherein the N different objects are different colors.

10. The navigating robot of claim 1, wherein the N different objects are visually different than each other.

11. The navigating robot of claim 1, wherein the navigation module includes:

an encoder module configured to receive the map and generate an encoding of the map;

a long short term memory (LSTM) module configured to generate an output based on the encoding; and a decoder module configured to decode the output of the LSTM module into the heatmap.

12. The navigating robot of claim 1, wherein the mask is a fog-of-war mask.

13. The navigating robot of claim 1, wherein the sampling module is configured to sample the portion from the masked heatmap based on maximizing a reward.

14. A navigating robot, comprising:

a means for detecting objects in images captured by a camera of the navigating robot while the navigating robot is in a real world space;

a means for generating a map including locations of objects captured in the images and at least one attribute of the objects; and a means trained to find and navigate to N different objects in the real world space in a predetermined order by:

when a location of a next one of the N different objects in the predetermined order is stored in the map, actuate one or more propulsion devices of the navigating robot and navigate toward the next one of the N different objects in the real world space; and when the location of the next one of the N different objects in the predetermined order is not stored in the map, actuate the one or more propulsion devices of the navigating robot and navigate to a portion of the real world space in the map not yet captured in any images from the camera, wherein the means trained to find and navigate to the N different objects in the real world space in the predetermined order includes:

a means for applying a mask to a heatmap that is generated based on the map; and a means for sampling, from the masked heatmap, the portion of the real world space in the map not yet captured in any images from the camera.

15. A navigation method, comprising:

detecting objects in images captured by a camera of a navigating robot while the navigating robot is in a real world space;

generating a map including locations of objects captured in the images and at least one attribute of the objects; and based on training, navigating to N different objects in the real world space in a predetermined order by:

when a location of a next one of the N different objects in the predetermined order is stored in the map, actuating one or more propulsion devices of the navigating robot and navigating toward the next one of the N different objects in the real world space; and when the location of the next one of the N different objects in the predetermined order is not stored in the map, actuating the one or more propulsion devices of the navigating robot and navigating to a portion of the real world space in the map not yet captured in any images from the camera, wherein the navigating includes:

applying a mask to a heatmap that is generated based on the map; and sampling, from the masked heatmap, the portion of the real world space in the map not yet captured in any images from the camera.

16. The navigation method of claim 15, wherein the training includes training based on finding and navigating to N simulated objects in a second predetermined order in a simulated space.

17. The navigation method of claim 15, wherein generating the map includes generating the map further based on input from a light detection and ranging (LIDAR) sensor of the navigating robot.

18. The navigation method of claim 15, wherein, when the location of the next one of the N different objects in the predetermined order is stored in the map, the navigation method includes:

determining a path to the location of the next one of the N different objects; and actuating the one or more propulsion devices of the navigating robot and navigating along the path toward the next one of the N different objects in the real world space.

19. The navigation method of claim 15, wherein at least a portion of the training includes training using reinforcement learning.

20. The navigation method of claim 15, wherein, when the next one of the N different objects in the predetermined order is captured in an image in route to the portion of the real world space, the navigation method includes actuating the one or more propulsion devices of the navigating robot and navigating toward the next one of the N different objects in the real world space.

21. The navigation method of claim 15, wherein at least one of:

the N different objects are all different types of object;

the N different objects are different colors; and the N different objects are visually different than each other.

22. The navigation method of claim 15, further comprising:

receiving the map and generating an encoding of the map;

by a long short term memory (LSTM) module, generating an output based on the encoding; and decoding the output into the heatmap.

23. The navigation method of claim 15, wherein the sampling includes sampling the portion from the masked heatmap based on maximizing a reward.

* * * * *